United States Patent
Smith et al.

(10) Patent No.: US 6,603,851 B1
(45) Date of Patent: Aug. 5, 2003

(54) TELECOMMUNICATIONS SERVICE CONTROL POINT WITH CODE BLOCKING

(75) Inventors: Stephen A. Smith, Parkville, MO (US); Joseph B. Donelan, Olathe, KS (US); Dale H. Foshe, Kansas City, MO (US)

(73) Assignee: Sprint Communications Company, L.P., Overland Park, KS (US)

(*) Notice: Subject to any disclaimer, the term of this patent is extended or adjusted under 35 U.S.C. 154(b) by 0 days.

(21) Appl. No.: 09/368,797

(22) Filed: Aug. 5, 1999

(51) Int. Cl.[7] .................................................. H04M 7/00
(52) U.S. Cl. .......................... 379/221.08; 379/112.03; 379/210.02; 379/221.09; 379/230
(58) Field of Search .......................... 379/111, 112.03, 379/112.04, 112.1, 133, 134, 210.02, 221.06, 221.08, 221.09, 112.09, 230

(56) References Cited

U.S. PATENT DOCUMENTS

| | | | |
|---|---|---|---|
| 4,191,860 A | * 3/1980 | Weber | 379/115.01 |
| 5,533,107 A | * 7/1996 | Irwin et al. | 379/201.01 |
| 5,570,410 A | * 10/1996 | Hooshiari | 379/32.03 |
| 5,581,610 A | * 12/1996 | Hooshiari | 379/133 |
| 5,694,463 A | 12/1997 | Christie et al. | |
| 5,778,057 A | * 7/1998 | Atai | 379/221.08 |
| 5,793,853 A | 8/1998 | Sbisa | |
| 6,018,519 A | 1/2000 | Ginzboorg | |
| 6,081,590 A | 6/2000 | Crowley et al. | |
| 6,327,361 B1 | * 12/2001 | Harshavardhana et al. | 379/230 |

OTHER PUBLICATIONS

Briere, Daniel, ""Sprint plans 'sweeping' network revisions"," Network World, vol. 10 (No. 38), p. 1 and 10, (Sep. 20, 1993).

* cited by examiner

Primary Examiner—Ahmad F. Matar
Assistant Examiner—Bing Bui
(74) Attorney, Agent, or Firm—Harley R. Ball; Steven J. Funk; Kevin D. Robb

(57) ABSTRACT

A telecommunications service control point having call blocking logic configured to block a percentage of call attempts to a called number and route a percentage of call attempts to the called number. The SCP comprises a processing system coupled to an interface. The processing system is configured to a process a plurality of query messages to generate a plurality of response messages containing call handling information for a plurality of call attempts to a called number. A first percentage of the call handling information includes instructions to block a corresponding first percentage of the plurality of call attempts to the called number. A second percentage of the call handling information includes instructions to route a corresponding second percentage of the plurality of call attempts to the called number. The interface is configured to receive the plurality of query messages and transmit the plurality of response messages.

24 Claims, 6 Drawing Sheets

TELECOMMUNICATIONS SERVICE CONTROL POINT WITH CODE BLOCKING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to a telecommunications Service Control Point (SCP) having call blocking logic. More specifically, to an SCP having code blocking logic configured to block a first percentage of call attempts to a called number and route a second percentage of call attempts to the called number.

2. Description of the Prior Art

In a telecommunications network, an SCP provides call handling information to devices in the network using call processing applications within the SCP. Some examples of call handling information provided by the SCP include toll free number routing information and calling card processing information. For instance, a telecommunications switch receives a call requiring call handling information to complete the call to a called number. Recognizing the need for the call handling information, the switch transmits a query message to the SCP. The SCP processes the query message and returns a response message containing the call handling information for the call. These query and response messages are typically Signaling System #7 (SS7) Transaction Capabilities Application Part (TCAP) protocol messages that are well known in the art.

It is a problem in the art of telecommunications to control call traffic during mass calling events. Some examples of mass calling events include concert ticket sales and call in contests. Without the ability to control this traffic, mass calling events can overload and crash an entire network. One solution to the problem is to perform call blocking in a telecommunications switch prior to querying the SCP for call handling information.

Presently, two forms of call blocking logic are implemented in switches. The first call blocking logic, commonly referred to in the art as "call gapping;" blocks all call attempts to a called number during a time interval following a completed call. Upon expiration of the time interval the next call attempt is routed using normal processing logic and a new time interval is established. If no call attempts are processed during the time interval, the next call attempt following the expiration of the time interval is routed using normal processing logic and no calls are blocked. The network is prevented from overloading by ensuring that a minimum amount of time passes between each call connected to the called number.

The second call blocking logic, commonly referred to in the art as "code blocking," blocks a certain percentage of call attempts to a called number. For example, if fifty percent (50%) is established as the percentage of call attempts to be blocked, the switch will block 50% of the call attempts to the called number.

Unfortunately, call blocking in switches is inefficient and results in an increased demand on network maintenance and service. In the telecommunications network call blocking can be implemented in either a single switch or multiple switches throughout the network. If call blocking is implemented in a single switch, congestion results at the switch because the single switch must handle both call blocking and SCP querying for all call attempts during a mass calling event. Similarly, where call blocking is implemented in several or all switches throughout the network, resources that could be allocated to other operations are used for call blocking. This results in an increase in demand for network maintenance and services.

Yet another problem with call blocking logic in switches is that it is decentralized within the network. The decentralized call blocking logic prevents other services provided by the network from easily being integrated with the call blocking logic.

SUMMARY OF THE INVENTION

The present invention advances the art by providing an SCP with code blocking. Code blocking is a call blocking logic configured to block a percentage of call attempts to a called number and route a remaining percentage of call attempts to the called number. A first advantage of the present invention is that code blocking provides a means to limit call traffic on a specific called number to prevent network overload. A second advantage of the present invention is that the code blocking is centralized in an SCP. The centralized code blocking reduces system maintenance and services operations and facilitates implementation of code blocking throughout a telecommunications network. A third advantage of the present invention is that the percentage of blocked calls can be defined differently to accommodate different call volumes for the same or different mass calling events. A fourth advantage of the present invention is that code blocking is interfaced with other call processing applications allowing for the construction and homogeneous integration of entire services in an SCP The present SCP comprises a processing system and an interface coupled to the processing system. The processing system is configured to process a plurality of query messages to generate a plurality of response messages containing call handling information for a plurality of call attempts to a called number. A first percentage of the call handling information includes instructions to block a corresponding first percentage of the plurality of call attempts to the called number. A second percentage of the call handling information includes instructions to route a corresponding second percentage of the plurality of call attempts to the called number. The interface is configured to receive the plurality of query messages and transmit the plurality of response messages.

In the context of the present invention the first, second, third, fourth, etc. connotations used to reference the messages, the calls, and the call handling information are used for the purpose of differentiating between different messages, calls, and call handling information and are not used to indicate a message sequence, call sequence or processing sequence. Also in the context of the present invention, blocking a call attempt to a called number is defined as automatically disconnecting the call or connecting the caller to a tone or announcement that indicates that the call is not being allowed. Routing a call to a called number is defined as instructing a communication device to connect the caller to one of a pre-determined or a dynamically determined call destination associated with the called number.

DETAILED DESCRIPTION OF THE PREFERRED EMBODIMENT

Figure 1:
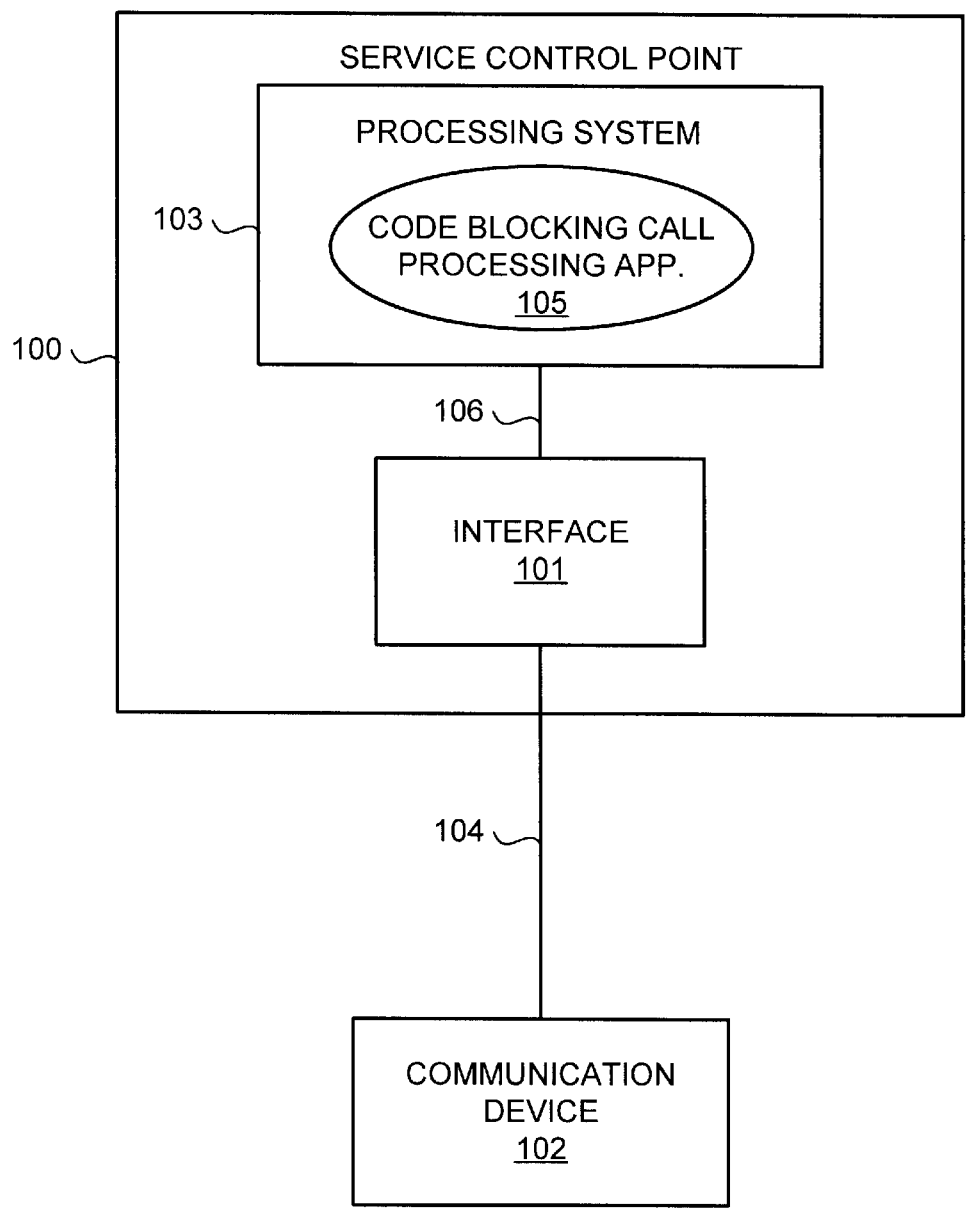
FIG. 1 illustrates a system architecture in an example of the present invention.

SCP Architecture FIG. 1

FIG. 1 depicts SCP 100 and communication device 102. SCP 100 comprises processing system 103 and interface 101. Processing system 103 comprises code blocking processing application 105. Those skilled in the art will appreciate that processing system 103 would include other call processing applications although only code blocking processing application 105 is shown for clarity. Communication device 102 is connected to interface 101 by link 104. One example of communication device 102 is a telecommunications switch. Link 104 could be any link capable of exchanging messages between interface 101 and communication device 102. An example of link 104 is a conventional SS7 TCAP link that is known in the art. Although they are not shown for clarity, interface 101 could handle numerous links to other elements in a telecommunications network. Interface 101 is connected to processing system 103 by link 106. Link 106 could be any link capable of exchanging information between interface 101 and processing system 103.

Processing system 103 could be any processing system capable of processing a plurality of query messages to generate a plurality of response messages containing call handling information for a plurality of call attempts to a called number. A first percentage of the call handling information includes instructions to block a corresponding first percentage of the plurality of call attempts to the called number. A second percentage of the call handling information includes instructions to route a corresponding second percentage of the plurality of call attempts to the called number. Processing system 103 uses code blocking processing application 105 to process call attempts to a called number that includes an applied code block.

Interface 101 could be any interface capable of receiving the plurality of query messages from communication device 102 and transmitting the plurality of response messages for communication device 102. Communication device 102 could be any communication device capable of transmitting the plurality of query messages to interface 101 and receiving the plurality of response messages from interface 101.

Figure 2:
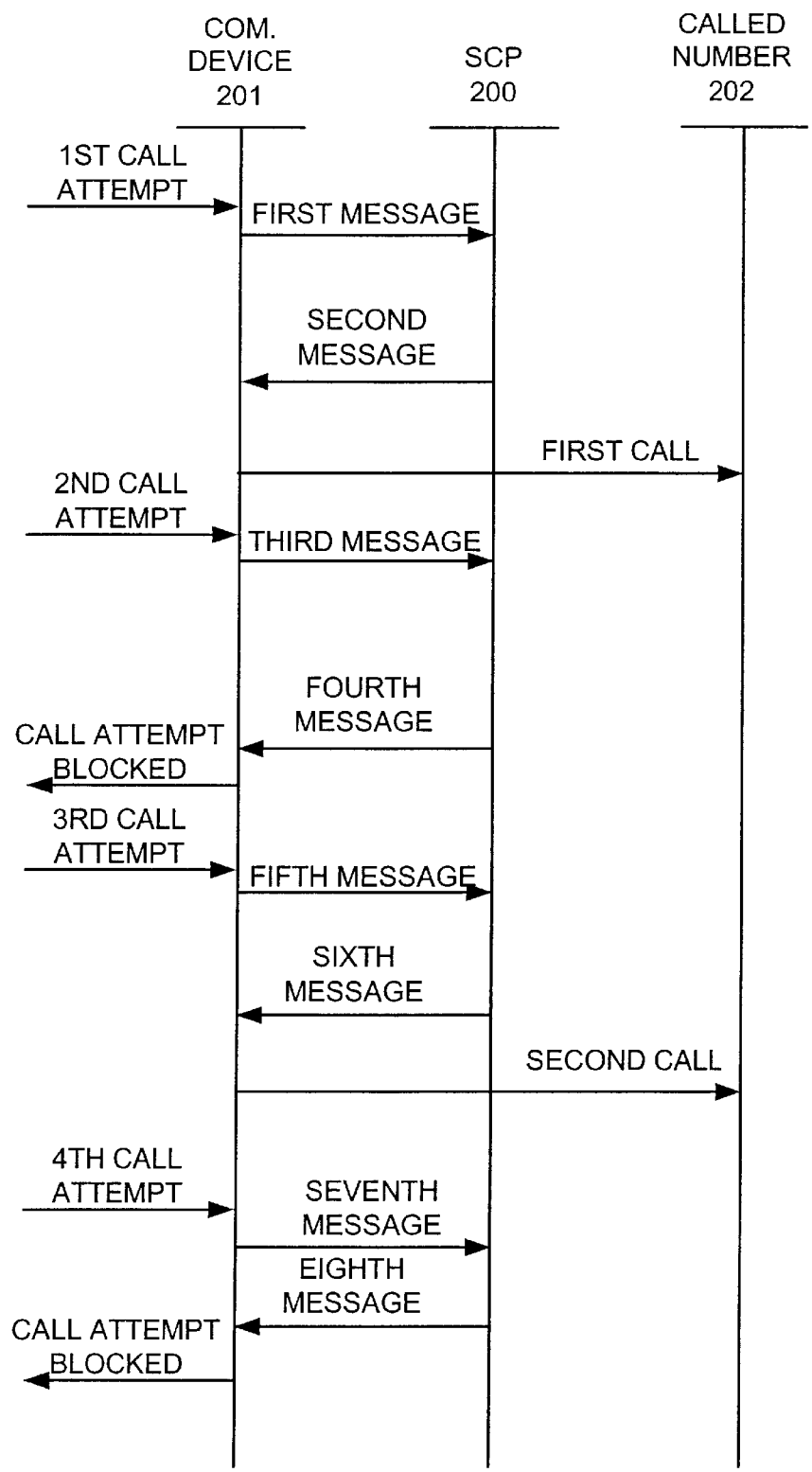
FIG. 2 is a message sequence diagram illustrating code blocking in an SCP in an example of the present invention.

Code Blocking Operation FIG. 2

FIG. 2 depicts a message sequence chart illustrating code blocking in an SCP 200 in an example of the present invention, but those skilled in the art will recognize numerous other configurations that are applicable to the invention described above. Those skilled in the art will also appreciate how combinations of features described below can be combined with the above-described embodiment.

In this example, a fifty percent (50%) code block is applied to called number 202. In FIG. 2 a first call attempt is received by communication device 201. Communication device 201 generates a first message for SCP 200 to obtain call handling information for the first call attempt. SCP 200 processes the first message to generate a second message containing first call handling information for the first call attempt. The first call handling information includes instructions to route the first call attempt to called number 202. SCP 200 transmits the second message for communication device 201. Communication device 201 processes the second message to route the first call attempt to called number 202 to complete a first call.

A second call attempt is received by communication device 201. Communication device 201 generates a third message for SCP 200 to obtain call handling information for the second call attempt. SCP 200 processes the third message to generate a fourth message containing second call handling information for the second call attempt. The second call handling information includes instructions to block the second call attempt. SCP 200 transmits the fourth message to communication device 201. Communication device 201 processes the fourth message, blocks the second call attempt to called number 202 and plays prompts or tones for the caller indicating the call was blocked.

A third call attempt is received by communication device 201. Communication device 201 generates a fifth message for SCP 200 to obtain call handling information for the third call attempt. SCP 200 processes the fifth message to generate a sixth message containing third call handling information for the third call attempt. The third call handling information includes instructions to route the third call attempt to called number 202. SCP 200 transmits the sixth message to communication device 201. Communication device 201 processes the sixth message to route the call to called number 202 to complete a second call.

A fourth call attempt is received by communication device 201. Communication device 201 generates a seventh message for SCP 200 to obtain call handling information for the fourth call attempt. SCP 200 processes the seventh message to generate an eighth message containing fourth call handling information for the fourth call attempt. The fourth call handling information includes instructions to block the fourth call attempt to called number 202. SCP 200 transmits the eighth message to communication device 201. Communication device 201 processes the eighth message, blocks the fourth call attempt to called number 202 and plays prompts or tones for the caller indicating the call was blocked. The operation for additional call attempts to called number 202 are handled as described above to block 50% of the call attempts to called number 202.

Figure 3:
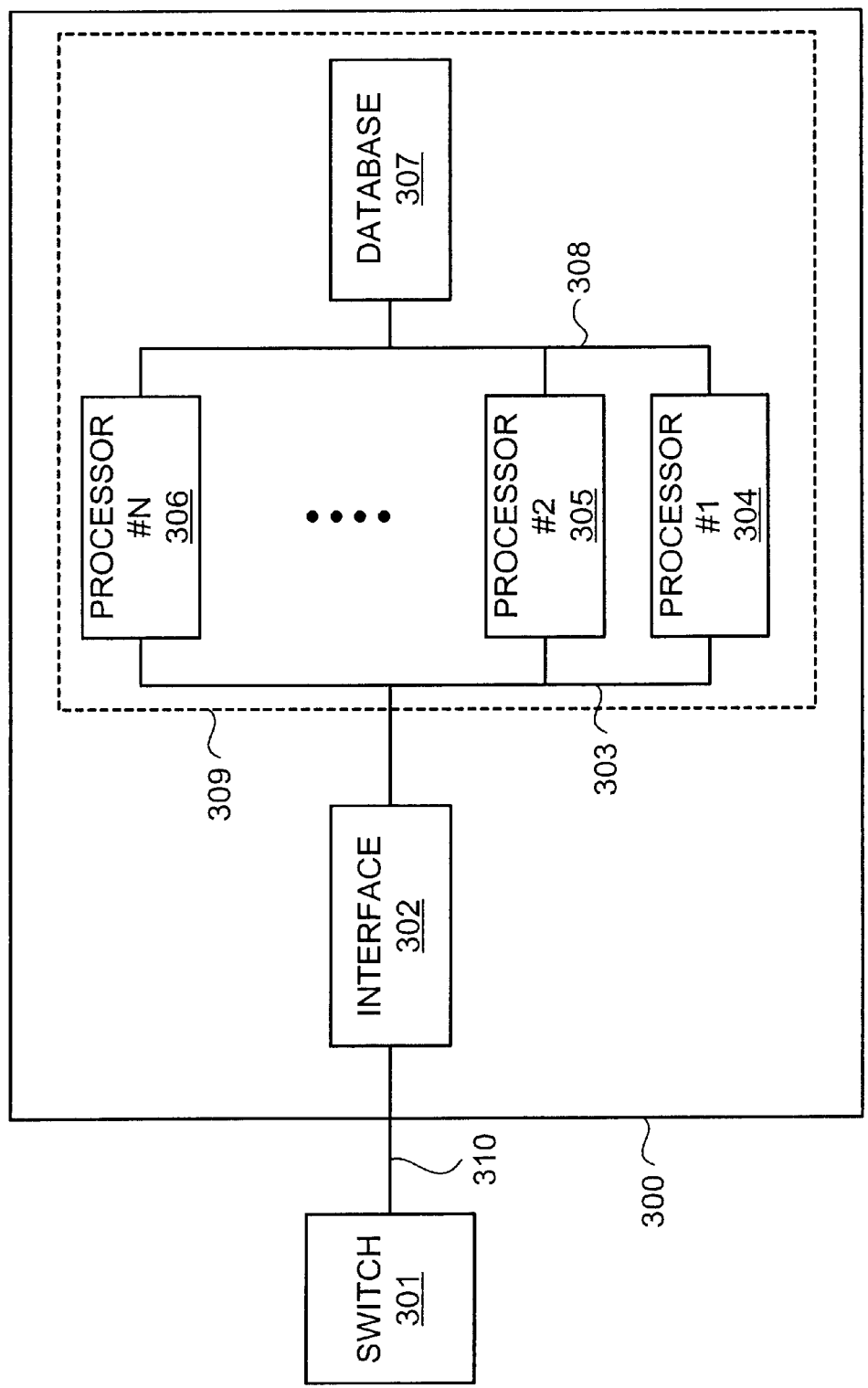
FIG. 3 illustrates an SCP architecture and operation in an example of the present invention.

SCP Architecture and Operation FIG. 3

FIG. 3 depicts an example of a system architecture of the present invention, but those skilled in the art will recognize numerous other configurations that are applicable to the invention described above. Those skilled in the art will also appreciate how combinations of features described below can be combined with the above-described embodiment.

FIG. 3 depicts SCP 300 and switch 301. SCP 300 comprises processing system 309, links 303 and 308, and interface 302. Processing system 309 comprises central processing units (CPUs) 304, 305, 306 and database 307. As those skilled in the art are aware, a processing system can be comprised of a single CPU or can be distributed across multiple CPUs. Multiple CPUs are depicted in FIG. 3, although only CPUs 304, 305, and 306 are shown for clarity. Switch 301 could be any switch capable of conforming to the message interface rules for interacting with SCP 300. One example of switch 301 is a DMS-250 telecommunications switch available from Nortel and modified in accordance with the present invention.

Interface 302 is connected to CPUs 304, 305 and 306 by link 303. Link 303 could be any link for interfacing processors and exchanging messages between interface 302 and processors 304, 305 and 306. Database 307 is connected to CPUs 304, 305 and 306 by link 308. Link 308 could be any link for interfacing processors and exchanging messages between database 307 and processors 304, 305 and 306. CPUs 304, 305 and 306 access database 307 to support call processing. Switch 301 is connected to interface 302 by link 310. Link 310 could be any link capable of exchanging messages between interface 102 and switch 101. One example of link 310 is an SS7 TCAP link.

Processing system 309 could be any processing system where one of CPUs 304, 305 or 306 is capable of processing a plurality of query messages to generate a plurality of response messages containing call handling information for a plurality of call attempts to a called number. A first percentage of the call handling information includes instructions to block a corresponding first percentage of the plurality of call attempts to the called number. A second percentage of the call handling information includes instructions to route a corresponding second percentage of the plurality of call attempts to the called number. An example of processing system 309 including CPUs 304, 305 and 306, link 308, and database 307 is the Tandem Himalaya loaded with the Tandem Guardian operating system, in addition to database management software and various conventional utilities.

Interface 302 could be any interface capable of receiving a first message and a third message and transmitting a second message with first call handling information and a fourth message with second call handling information for switch 301. An example of interface 302 is an interface configured to receive multiple messages in multiple protocols and provide access to processing system 309.

Figure 4:
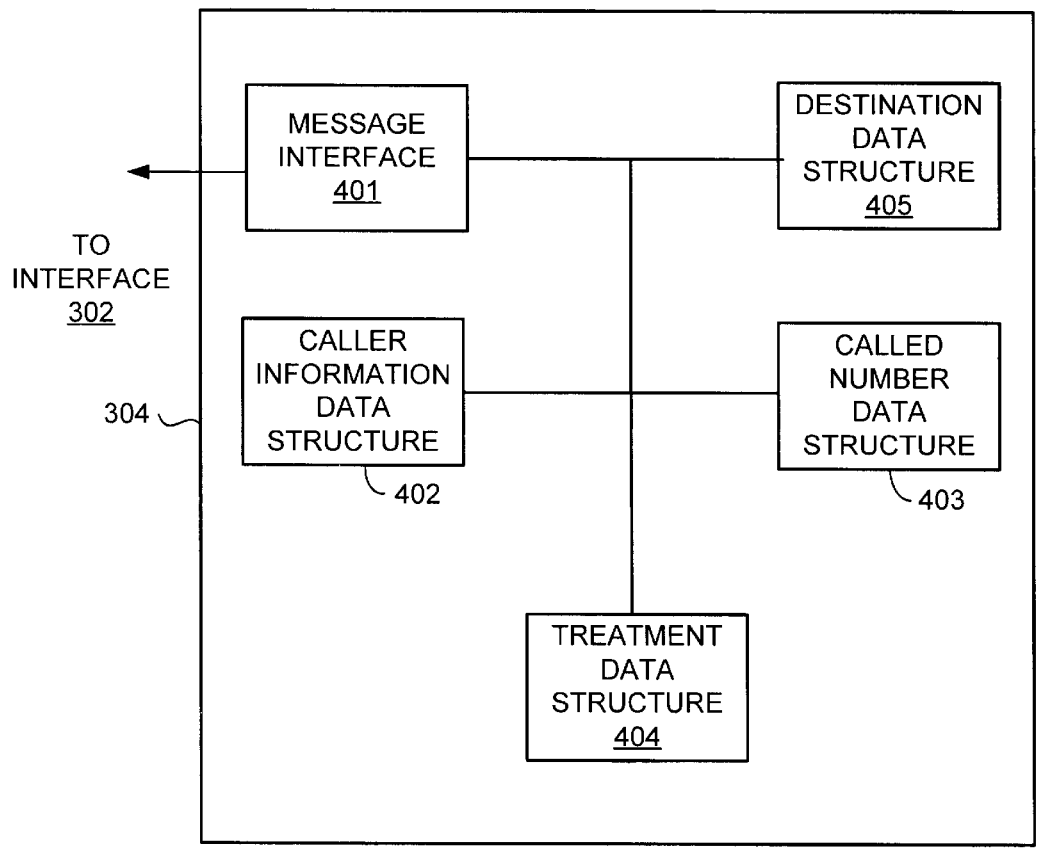
FIG. 4 illustrates a call processing architecture in an example of the present invention.

Call Processing Architecture FIG. 4

FIG. 4 illustrates the operation and processing logic in CPU 304 of SCP 300 in some embodiments of the invention. The processing logic in other CPUs would be similar. Those skilled in the art will appreciate that numerous other configurations of the processing logic can be derived from the following example that are within the scope of the invention. Those skilled in the art will also appreciate how the principles illustrated in this example can be used in other examples of the invention.

FIG. 4 depicts an example of CPU 304. CPU 304 comprises message interface 401, called number data structure 403, destination data structure 405, caller information data structure 402 and treatment data structure 404. CPU 304 uses message interface 401 to exchange messages with interface 302. CPU 304 processes the messages from message interface 401 using data structures. Data structures are tables that can be entered with information or pointers. CPU 304 processes a data structure until the data structure yields either the desired information or a pointer to another data structure.

CPU 304 could include other data structures but only data structures 402, 403, 404 and 405 are shown for clarity. Some examples of other data structures include without limitation, a default data structure used to provide default connections or handle mistakes in data structure processing, a resource data structure used to access external call processing applications and databases, or an optional decision data structure used to apply additional logic to a call. Some examples of additional logic applied to a call include without limitation, processing the call based on a time of day, II digits, call distribution, or accessing remote processor information.

In this example, CPU 304 receives a first message in message interface 401. CPU 304 enters caller information data structure 402 with the caller information from the first message. The caller information data structure 402 can be used to partition callers into logical groupings. For example, callers who subscribe to a particular service provider could be grouped together in caller information data structure 402. Caller information data structure 402 can partition callers by their telephone number, by a circuit used to place the call, by the method of carrier selection, or by a type of device used to place the call. The caller information data structure 402 yields a pointer to the destination data structure 405, treatment data structure 404 or called number data structure 403.

Called number data structure 403 is entered with a pointer to the called number. Examples of called numbers include but are not limited to, toll free numbers, private network numbers or plain old telephone numbers. In operation, called number data structure 403 is entered using a pointer to a called number. If code blocking is applied to the called number, called number data structure 403 determines whether the call attempt should be blocked or routed to the called number. If the call attempt is routed to the called number, called number data structure 403 yields a pointer to destination data structure 405. Destination data structure 405 generates call handling information that includes instructions to route the call attempt to the called number and returns an SCP response message for message interface 401.

If the call attempt should be blocked, called number data structure 403 yields a pointer to treatment data structure 406. Treatment data structure 406 generates call handling information that includes instructions to block the current call attempt and returns an SCP response message for message interface 401.

Called number data structure 403 uses random allocation percentage tables to determine whether to route the call attempt or block the call attempt. A random number generator from 1 to 100 determines whether to process or block a call attempt to the called number. The following is an example of random allocation percentage tables, wherein (R) represents a routed call and (B) indicates a blocked call.

Treat one percent, Process 99 percent: BRRRRRRRR-RRRRRRRRRRRRRRRRRRRRRRRRRRRRRRRRRR Treat 2 percent, Process 98 percent: BBRRRRRRRR-RRRRRRRRRRRRRRRRRRRRRRRRRRRRRRRRRR Treat 3 percent, Process 97 percent: BBBRRRRRR-RRRRRRRRRRRRRRRRRRRRRRRRRRRRRRRRRR Treat 100 percent, Process 0 percent: RRRRRRRR-RRRRRRRRRRRRRRRRRRRRRRRRRRRRRRRRR-RRRR Alternatively, called number data structure 403 could use fixed percentage routing tables. Fixed percentage routing tables are 100 entries long and represent the order that calls must be routed to achieve the desired percentage. A pointer with an initial value zero is used to access the table corresponding to the desired code blocking percentage. Calls are processed by indexing the table with the pointer and incrementing the pointer for a next call after processing. After 100 calls have been processed, the pointer is reset to point to the beginning of the table and the call blocking sequence is repeated for the next 100 calls. The following is an example of fixed percentage tables, wherein (R) represents a routed call and (B) indicates a blocked call.

To block ten percent:

RRRRBRRRRR RRRRBRRRRR RRRRBRRRRR RRRRBRRRRR RRRRBRRRRR

To block twenty percent:
RRBRRRRBRR RRBRRRRBRR RRBRRRRBRR RRBRRRRBRR RRBRRRRBRR

To block fifty percent: BRBRBRBRBR BRBRBRBRBR BRBRBRBRBR BRBRBRBRBR BRBRBRBRBR

To block ninety percent: BBBBBRBBBB BBBBBRBBBB BBBBBRBBBB BBBBBRBBBB BBBBBRBBBB

Figure 5:
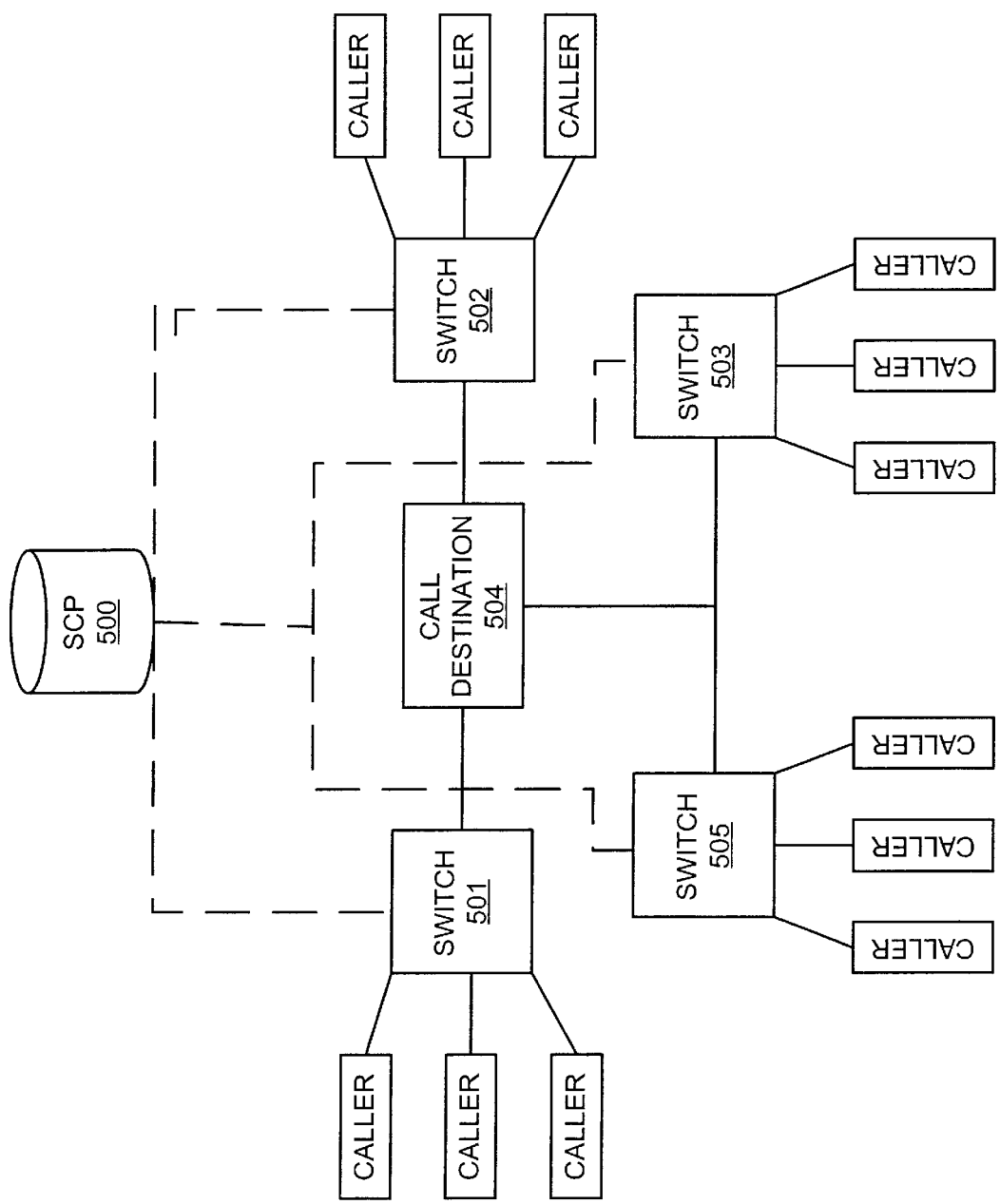
FIG. 5 illustrates a network architecture in an example of the present invention.

Network Architecture FIG. 5

FIG. 5 illustrates an example of a network architecture for code blocking in an example of the present invention. FIG. 5 depicts SCP 500, switches 501, 502, 503 and 505, call destination 504 and a plurality of callers. Switches 501, 502, 503 and 505 are connected to SCP 500 and call destination 504. Those skilled in the art will appreciate that numerous other network configurations can be derived from the following example that are within the scope of the invention and that the network depicted in FIG. 5 would include other devices not shown for reasons of clarity. Those skilled in the art will also appreciate how the principles illustrated in this example can be used in other examples of the invention.

In this example, SCP 500 performs selective code blocking. Selective code blocking applies code blocking based on the switch or group of switches a call attempt is placed through in the network. For example, a first plurality of call attempts to a called number from callers connected to switch 502 are received in switch 502. Switch 502 queries SCP 500 for call handling information. Simultaneously, a second plurality of call attempts to the called number from callers connected to switches 503 and 501 are received in switches 503 and 501. Switches 503 and 501 query SCP 500 for call handling information. SCP 500 generates call handling information that blocks the defined code block percentage of call attempts from switch 502, and routes all call attempts received from switches 501 and 503 without applying code blocking. Thus, while the called number contains a code block, it is only applied to call attempts received from switch 502.

In another example, a first plurality of call attempts to a called number from callers connected to switch 502 are received in switch 502. Switch 502 queries SCP 500 for call handling information. Simultaneously, a second plurality of call attempts to the called number from callers connected to switches 503 and 501 are received in switches 503 and 501. Switches 503 and 501 query SCP 500 for call handling information. SCP 500 generates call handling information that blocks a defined code block percentage (first percentage) of call attempts from switch 502 and routes the remaining call attempts (second percentage) from switch 502 to the called number. SCP 500 blocks a second defined code block percentage (third percentage) of call attempts from switches 501 and 503 and routes the remaining call attempts (fourth percentage) from switches 501 and 503 to the called number. Thus, the same called number could include different code block percentages for different switches within the network.

In another example, a first plurality of call attempts to a called number from callers connected to a first group of switches 502 and 501 are received in switches 502 and 501. Switches 502 and 501 query SCP 500 for call handling information. Simultaneously, a second plurality of call attempts to the called number from callers connected to a second group of switches 503 and 505 are received in switches 503 and 505. Switches 503 and 505 query SCP 500 for call handling information. SCP 500 generates call handling information that blocks the defined code block percentage of call attempts from the first group of switches 502 and 501, and routes all call attempts received from the second group of switches 503 and 505 without applying code blocking. Thus, while the called number contains a code block, it is only applied to call attempts received from the first group of switches 502 and 501.

Advantageously, selective code blocking permits customized call blocking where a majority of the call attempts to a called number originate from a specific geographic area and are routed through a specific switch or group of switches. Also advantageously, selective code blocking permits application of different code blocking percentages to different switches or groups of switches to address switch resource shortages.

Figure 6:
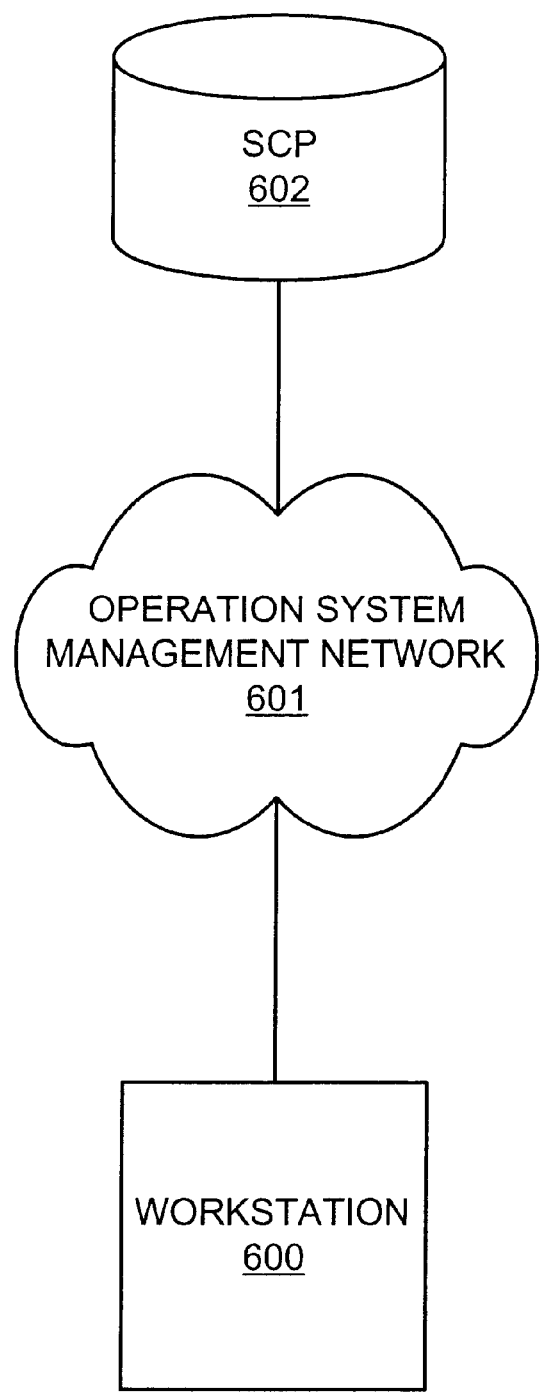
FIG. 6 illustrates a network architecture in an example of the present invention.

Network Architecture FIG. 6

FIG. 6 illustrates a network architecture for code blocking in an example of the present invention. FIG. 6 depicts workstation 600, operation system management network (OSMN) 601, and SCP 602. Workstation 600 is connected to OSMN 601 and OSMN 601 is connected to SCP 602. Those skilled in the art will appreciate that additional workstations and SCP's could be connected to OSMN 601 although only workstation 600 and SCP 602 are shown for clarity.

Code blocking is applied to a called number by a control. A control is an instruction to SCP 602 that includes a parameter indicating the percentage of calls to block. A network administrator using workstation 600 applies controls. Workstation 600 is configured to apply code blocking to a called number, change a defined code block percentage, update a code block percentage, or remove an applied code block from the called number. Workstation 600 sends the control to SCP 602 using OSMN 601. OSMN 601 translates the control into the processing language used by SCP 602. Those skilled in the art would readily understand the connection and operation of workstation 600, OSMN 601 and SCP 602.

Workstation 600 is also configured to receive statistical information from SCP 602 on the operation and effectiveness of a control. Some examples of information passed by SCP 602 include without limitation, the number of calls attempted, number of calls completed and number of calls blocked. It should be noted that where no code blocking control is applied to a called number, SCP 602 processes call attempts to the called number using normal call processing and routing logic.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

We claim:

1. A telecommunications service control point (SCP) comprising:

an interface configured to receive a first plurality of query messages for a first plurality of call attempts to a called number; and a processing system comprising a called number data structure, a treatment data structure, and a destination data structure and configured to:

receive the first plurality of query messages;
process the first plurality of query messages in the called number data structure to determine a first percentage of the first plurality of call attempts to block, and to yield a pointer to the treatment data structure; and
enter the pointer to the treatment data structure into the treatment data structure to yield a first plurality of response messages, wherein the first plurality of response messages includes instructions to block a corresponding first percentage of the first plurality of call attempts to the called number;
wherein the interface is further configured to transmit the first plurality of response messages.

2. The SCP of claim 1, wherein the processing system is further configured to:
process the first plurality of query messages in the called number data structure to determine a second percentage of the first plurality of call attempts to route to the called number, and to yield a pointer to the destination data structure; and
enter the pointer to the destination data structure into the destination data structure to yield a second plurality of response messages, wherein the second plurality of response messages includes instructions to route a corresponding second percentage of the first plurality of call attempts to the called number.

3. The SCP of claim 2, wherein the processing system is further configured to:
receive a second plurality of query messages for a second plurality of call attempts to the called number;
process the second plurality of query messages in the called number data structure to determine a percentage of the second plurality of call attempts to the called number to route to the called number, and to yield a pointer to the destination data structure; and
enter the pointer to the destination data structure into the destination data structure to yield a third plurality of response messages, wherein the third plurality of response messages includes instructions to route all of the second plurality of call attempts to the called number.

4. The SCP of claim 2, wherein the processing system is further configured to:
receive a second plurality of query messages for a second plurality of call attempts to the called number;
process the second plurality of query messages in the called number data structure to determine a third percentage of the second plurality of call attempts to block, and to yield a pointer to the treatment data structure; and
enter the pointer to the treatment data structure into the treatment data structure to yield a third plurality of response messages, wherein the third plurality of response messages includes instructions to block a corresponding third percentage of the second plurality of call attempts to the called number.

5. The SCP of claim 4, wherein the processing system is further configured to:
process the second plurality of query messages in the called number data structure to determine a fourth percentage of the second plurality of call attempts to route to the called number, and to yield a pointer to the destination data structure; and
enter the pointer to the destination data structure into the destination data structure to yield a fourth plurality of response messages, wherein the fourth plurality of response messages includes instructions to route a corresponding fourth percentage of the second plurality of call attempts to the called number.

6. The SCP of claim 3, wherein the called number comprises a toll free number.

7. A telecommunications system, comprising:
a first communication device configured to transmit a first plurality of query messages for a first plurality of call attempts to a called number; and
a service control point (SCP) comprising a called number data structure, a treatment data structure, and a destination data structure and configured to:
receive the first plurality of query messages;
process the first plurality of query messages in the called number data structure to determine a first percentage of the first plurality of call attempts to block, and to yield a pointer to the treatment data structure;
enter the pointer to the treatment data structure into the treatment data structure to yield a first plurality of response messages, wherein the first plurality of response messages include instructions to block a corresponding first percentage of the first plurality of call attempts to the called number; and
transmit the first plurality of response messages;
wherein the first communication device is further configured to receive the first plurality of response messages.

8. The system of claim 7, wherein the SCP is further configured to:
process the first plurality of query messages in the called number data structure to determine a second percentage of the first plurality of call attempts to route to the called number, and to yield a pointer to the destination data structure; and
enter the pointer to the destination data structure into the destination data structure to yield a second plurality of response messages, wherein the second plurality of response messages includes instructions to route a corresponding second percentage of the first plurality of call attempts to the called number.

9. The system of claim 8, further comprising:
a second communication device connected to the SCP and configured to transmit a second plurality of query messages for a second plurality of call attempts to the called number;
wherein the SCP is further configured to:
receive the second plurality of query messages from the second communication device;
process the second plurality of query messages in the called number data structure to determine a percentage of the second plurality of call attempts to route to the called number, and to yield a pointer to the destination data structure; and
enter the pointer to the destination data structure into the destination data structure to yield a third plurality of response messages, wherein the third plurality of response messages include instructions to route all of the second plurality of call attempts to the called number.

10. The system of claim 8, further comprising:
a second communication device connected to the SCP and configured to transmit a second plurality of query messages for a second plurality of call attempts to the called number;

wherein the SCP is further configured to:
receive the second plurality of query messages;
process the second plurality of query messages in the called number data structure to determine a third percentage of the second plurality of call attempts to block, and to yield a pointer to the treatment data structure;
enter the pointer to the treatment data structure into the treatment data structure to yield a third plurality of response messages, wherein the third plurality of response messages includes instructions to block a corresponding third percentage of the second plurality of call attempts to the called number.

11. The system of claim 10, wherein the SCP is further configured to:
process the second plurality of query messages in the called number data structure to determine a fourth percentage of the second plurality of call attempts to route to the called number, and to yield a pointer to the destination data structure; and
enter the pointer to the destination data structure into the destination data structure to yield a fourth plurality of response messages, wherein the fourth plurality of response messages includes instructions to route a corresponding fourth percentage of the second plurality of call attempts to the called number.

12. The system of claim 9, wherein the called number comprises a toll free number.

13. A method of handling calls in a service control point (SCP), wherein the SCP comprises a called number data structure, a treatment data structure, and a destination data structure, the method comprising:
receiving a first plurality of query messages for a first plurality of call attempts to a called number from a first communication device;
processing the first plurality of query messages in the called number data structure to determine a first percentage of the first plurality of call attempts to block, and to yield a pointer to the treatment data structure;
entering the pointer to the treatment data structure into the treatment data structure to yield a first plurality of response messages, wherein the first plurality of response messages includes instructions to block a corresponding first percentage of the first plurality of call attempts to the called number; and
transmitting the first plurality of response messages to the first communication device.

14. The method of claim 13, further comprising:
processing the first plurality of query messages in the called number data structure to determine a second percentage of the first plurality of call attempts to route to the called number, and to yield a pointer to the destination data structure; and
entering the pointer to the destination data structure into the destination data structure to yield a second plurality of response messages, wherein the second plurality of response messages includes instructions to route a corresponding second percentage of the first plurality of call attempts to the called number.

15. The method of claim 14, further comprising:
receiving a second plurality of query messages for a second plurality of call attempts to the called number from a second communication device;
processing the second plurality of query messages in the called number data structure to determine a percentage of the second plurality of call attempts to route to the called number, and to yield a pointer to the destination data structure;
entering the pointer to the destination data structure into the destination data structure to yield a third plurality of response messages, wherein the third plurality of response messages include instructions to route all of the second plurality of call attempts to the called number; and
transmitting the third plurality of response messages to the second communication device.

16. The method of claim 14, further comprising:
receiving a second plurality of query messages for a second plurality of call attempts to the called number;
processing the second plurality of query messages in the called number data structure to determine a third percentage of the second plurality of call attempts to block, and to yield a pointer to the treatment data structure; and
entering the pointer to the treatment data structure into the treatment data structure to yield a third plurality of response messages, wherein the third plurality of response messages includes instructions to block a corresponding third percentage of the second plurality of call attempts to the called number.

17. The method of claim 16, further comprising:
processing the second plurality of query messages in the called number data structure to determine a fourth percentage of the second plurality of call attempts to route to the called number, and to yield a pointer to the destination data structure; and
entering the pointer to the destination data structure into the destination data structure to yield a fourth plurality of response messages, wherein the fourth plurality of response messages includes instructions to route a corresponding fourth percentage of the second plurality of call attempts to the called number.

18. The method of claim 15, wherein the called number comprises a toll free number.

19. A software product for use in operating a service control point (SCP), wherein the SCP comprises a called number data structure, a treatment data structure, and a destination data structure, the product comprising:
processing system instructions operational when executed by an SCP processing system to direct the SCP processing system to:
receive a first plurality of query messages for a first plurality of call attempts to a called number;
process the first plurality of query messages in the called number data structure to determine a first percentage of the first plurality of call attempts to block, and to yield a pointer to the treatment data structure; and
enter the pointer to the treatment data structure into the treatment data structure to yield a first plurality of response messages, wherein the first plurality of response messages includes instructions to block a corresponding first percentage of the first plurality of call attempts to the called number;
interface instructions operational when executed by the SCP processing system to direct an SCP interface to receive the first plurality of query messages and transmit the first plurality of response messages; and
a storage medium operational to store the processing system instructions and the interface instructions.

20. The product of claim 19, wherein the processing system instructions further direct the SCP processing system to:

process the first plurality of query messages in the called number data structure to determine a second percentage of the first plurality of call attempts to route to the called number, and to yield a pointer to the destination data structure; and enter the pointer to the destination data structure into the destination data structure to yield a second plurality of response messages, wherein the second plurality of response messages includes instructions to route a corresponding second percentage of the first plurality of call attempts to the called number.

21. The product of claim 20, wherein the processing system instructions further direct the SCP processing system to:

receive a second plurality of query messages for a second plurality of call attempts to the called number;

process the second plurality of query messages in the called number data structure to determine a percentage of the second plurality of call attempts to route to the called number, and to yield a pointer to the destination data structure; and enter the pointer to the destination data structure into the destination data structure to yield a third plurality of response messages, wherein the third plurality of response messages includes instructions to route all of the second plurality of call attempts to the called number.

22. The product of claim 20, wherein the processing system instructions further direct the SCP processing system to:

receive a second plurality of query messages for a second plurality of call attempts to the called number;

process the second plurality of query messages in the called number data structure to determine a third percentage of the second plurality of call attempts to block, and to yield a pointer to the treatment data structure; and enter the pointer to the treatment data structure into the treatment data structure to yield a third plurality of response messages, wherein the third plurality of response messages includes instructions to block a corresponding third percentage of the second plurality of call attempts to the called number.

23. The product of claim 22, wherein the processing system instructions further direct the SCP processing system to:

process the second plurality of query messages in the called number data structure to determine a fourth percentage of the second plurality of call attempts to route to the called number, and to yield a pointer to the destination data structure; and enter the pointer to the destination data structure into the destination data structure to yield a fourth plurality of response messages, wherein the fourth plurality of response messages includes instructions to route a corresponding fourth percentage of the second plurality of call attempts to the called number.

24. The product of claim 21, wherein the called number comprises a toll free number.

* * * * *